(12) United States Patent
Van Staalduinen

(10) Patent No.: US 11,284,570 B2
(45) Date of Patent: Mar. 29, 2022

(54) SYSTEM FOR CULTIVATING PLANTS OR VEGETABLES

(71) Applicant: LOGIQS B.V., Maasdijk (NL)

(72) Inventor: Gerrit Johannes Van Staalduinen, Maasdijk (NL)

(73) Assignee: LOGIQS B.V., Maasdijk (NL)

( * ) Notice: Subject to any disclaimer, the term of this patent is extended or adjusted under 35 U.S.C. 154(b) by 328 days.

(21) Appl. No.: 16/469,399

(22) PCT Filed: Dec. 14, 2017

(86) PCT No.: PCT/NL2017/050837
§ 371 (c)(1),
(2) Date: Jun. 13, 2019

(87) PCT Pub. No.: WO2018/111102
PCT Pub. Date: Jun. 21, 2018

(65) Prior Publication Data
US 2019/0307079 A1    Oct. 10, 2019

(30) Foreign Application Priority Data

Dec. 14, 2016    (NL) ..................................... 2018002

(51) Int. Cl.
*A01G 9/24* (2006.01)
*A01G 9/04* (2006.01)
(Continued)

(52) U.S. Cl.
CPC ............. *A01G 9/247* (2013.01); *A01G 9/042* (2013.01); *A01G 9/1423* (2013.01);
(Continued)

(58) Field of Classification Search
CPC ...... A01G 9/247; A01G 27/008; A01G 9/042; A01G 9/1423; A01G 31/06; A01G 31/04; A01G 27/00
(Continued)

(56) References Cited

U.S. PATENT DOCUMENTS

| 2005/0160670 A1* | 7/2005 | Appel | ...................... A01G 9/02 47/66.6 |
| 2015/0373932 A1* | 12/2015 | Lame | ..................... A01G 9/033 210/335 |

FOREIGN PATENT DOCUMENTS

| CA | 2758413 A1 * | 5/2013 | ............. A01G 31/06 |
| CA | 2 892 131 A1 | 11/2016 | |

(Continued)

OTHER PUBLICATIONS

Office Action dated Mar. 3, 2021, issued in counterpart CN Application No. 201780076514.7, with English Translation. (10 pages).

(Continued)

*Primary Examiner* — David J Parsley
*Assistant Examiner* — Carly W. Lynch
(74) *Attorney, Agent, or Firm* — WHDA, LLP

(57) ABSTRACT

A system for cultivating plants or vegetables, includes a carrier for holding trays accommodating the plants or vegetables, the carrier having an interior formed by a bottom and raised edges extending circumferentially along the bottom to form a container for holding a liquid for cultivating plants or vegetables, and an opening arranged at the bottom; a frame to support the carrier; a supply duct for supplying the liquid towards the carrier, the supply duct arranged at least partly under the carrier; a sprayer device which is at one end fluidly connected to the supply duct and which is at the other provided with a nozzle to direct a flow of liquid to the interior of the carrier; wherein the sprayer device is arranged through the opening of the carrier, the nozzle protruding into the interior of the carrier when the carrier is positioned on the frame.

9 Claims, 3 Drawing Sheets

(51) Int. Cl.
*A01G 9/14* (2006.01)
*A01G 27/00* (2006.01)
*A01G 31/06* (2006.01)

(52) U.S. Cl.
CPC ........... *A01G 27/008* (2013.01); *A01G 31/06* (2013.01); *A01G 27/00* (2013.01); *Y02P 60/21* (2015.11)

(58) Field of Classification Search
USPC .................................................. 47/79, 66.6
See application file for complete search history.

(56) References Cited

FOREIGN PATENT DOCUMENTS

| | | |
|---|---|---|
| CN | 1422521 A | 6/2003 |
| CN | 2845430 Y | 12/2006 |
| CN | 203608658 U | 5/2014 |
| CN | 204069885 U | 1/2015 |
| CN | 204191230 U | 3/2015 |
| CN | 104509408 A | 4/2015 |
| CN | 104756851 A | 7/2015 |
| CN | 204721914 U | 10/2015 |
| DE | 91 15 418 U1 | 7/1992 |
| JP | H119105 A | 1/1999 |
| JP | 2008079504 A | 4/2008 |
| JP | 2010226963 A | 10/2010 |
| NL | 1 026 173 C2 | 11/2005 |
| NL | 1026173 C2 * | 11/2005 ............. A01G 9/247 |
| WO | WO-2013147603 A1 * | 10/2013 ............. A01G 31/06 |
| WO | 2014/196744 A1 | 12/2014 |
| WO | WO-2016129674 A1 * | 8/2016 ............. A01G 31/04 |

OTHER PUBLICATIONS

International Search Report dated Feb. 22, 2018, issued in counterpart application No. PCT/NL2017/050837 (4 pages).

* cited by examiner

SYSTEM FOR CULTIVATING PLANTS OR VEGETABLES

FIELD OF THE INVENTION

The invention relates to a system for cultivating plants or vegetables, the system comprising a carrier for holding trays accommodating the plants or vegetables to be cultivated, the carrier having an interior formed by a bottom and raised edges extending circumferentially along the bottom to form a container for holding a liquid for cultivating plants or vegetables.

BACKGROUND OF THE INVENTION

In the art, such carriers are used for holding a layer of a liquid, such as water optionally provided with ingredients to stimulate cultivating of plants or vegetables. Such carrier is a container for holding one or more trays in which the plants or vegetables are locating, the trays resting on the bottom of the carrier or floating on the water surface. To achieve the best cultivating conditions, a root portion growing out of a ball of earth needs to be above the water surface at a constant distance.

Such a system is in general well known in the field of application. To achieve the highest degree of capacity utilization of the carrier, the plants or vegetables are positioned in a pattern in which each plant is spaced apart from its neighboring plant, for example at a distance of 140 mm between neighboring plants. Independent from the payload, it is a further goal to cover the carrier with a maximum of plants to prevent light from shining on the water which stimulates the cultivation of alga. To prevent the presence of alga in the carrier from affecting the cultivation of the plants or vegetables, the system is normally provided with a means for circulating the water through the carrier. In a more preferred situation, the water needs to be refreshed on a periodical basis. Therefore, the carrier is equipped with an inlet and outlet device arranged at the bottom of the carrier. Both the inlet and the outlet device affects the pattern and which reduces the degree of capacity utilization of the carrier, which is a drawback of such devices.

It is an object of the invention to provide a system which alleviates this drawback.

SUMMARY OF THE INVENTION

The invention provides a system for cultivating plants or vegetables, the system comprising:
- a carrier for holding trays accommodating the plants or vegetables to be cultivated, the carrier having an interior formed by a bottom and raised edges extending circumferentially along the bottom to form a container for holding a liquid for cultivating plants or vegetables, and an opening arranged at the bottom;
- a frame to support the carrier;
- a supply duct for supplying the liquid towards the carrier, the supply duct arranged at least partly under the carrier;
- a sprayer device which is at one end fluidically connected to the supply duct and which is at the other provided with a nozzle to direct a flow of liquid to the interior of the carrier;
wherein the sprayer device is arranged through the opening of the carrier when positioned on the frame. Advantageous embodiments are defined in the dependent claims.

DETAILED DESCRIPTION OF THE INVENTION

The invention concerns a system for cultivating plants or vegetables. To this end, the carrier is provided with one opening as both the inlet and the outlet of the liquid to be circulated through the carrier, rather than two openings. In other words, the system according to the invention provides a solution to reduce the number of openings present in the bottom of the carrier, thereby allowing an improved degree of capacity utilization of the carrier compared to the carrier having a first opening for the inlet and a second opening for the outlet. Having obtained the improved degree of capacity utilization of the carrier, an improved coverage with a maximum of plants is also achieved thereby reducing the cultivation of alga since the light to shine on the water is covered accordingly.

In an embodiment, a discharge duct is arranged to be located partly below the opening, the discharge duct having an open top at least at a portion of the discharge duct below the opening for receiving discharged liquid from the carrier flowing through the opening, the opening being confined by its edge, the opening allowing a clearance between the sprayer device and the edge so as to discharge the liquid via the opening towards the discharge duct. In this way, the opening provides an outlet means or a drain to direct the liquid to flow at least partly along the sprayer device, towards the discharge duct located below the opening.

In an embodiment, the supply duct and the discharge duct are, from the position of the opening and along at least a portion along their longitudinal direction, arranged to be parallel to each other. The supply duct is positioned to extend over the discharge duct, so that the discharge duct receives the liquid from the opening. In this way, the liquid flowing along the sprayer device which is leaking or adhering via the outer wall of the supply duct along a lower part of the supply duct in the form of droplets, may be received in the discharge duct and conveyed for removal.

In an embodiment, the nozzle is oriented in such a way as to direct a flow of liquid from the supply duct to an exterior side of the sprayer device, the flow of liquid being substantially parallel to the longitudinal direction of the discharge duct, so as to cause the liquid to fall into the discharge duct when the carrier is absent and to fall into the carrier when the carrier is present on the frame. In this way, a flow of liquid leaving the nozzle is directed along the longitudinal direction of the discharge duct, so as to maximize the amount of the liquid that is received in the discharge duct. Liquid spillage is rather limited and typically only droplets and spatters around the discharge duct may be expected.

In an embodiment, the nozzle is oriented in such a way with respect to the carrier so as to optimize the circulation of the liquid within the carrier to refresh the liquid present in the carrier. In this way, alga that adversely affects plant or vegetable growth is not given the opportunity to grow and flourish.

In an embodiment, the nozzle is oriented to be transverse to one of the raised edges of the carrier. In this way, when liquid collides with the raised wall of the carrier, the flow of the liquid is divided into two opposite directions parallel with the raised wall to disperse through the carrier and convey the alga from most positions of the carrier.

In an embodiment, the nozzle is located in a corner portion of the carrier. In this way, the flow of the liquid is directed to a remote portion of the carrier, causing the liquid being extracted from most positions of the carrier to flow to the opening for discharge.

In an embodiment, the carrier is elongated along its longitudinal direction and the longitudinal direction of the carrier is substantially transverse to the longitudinal direction of the discharge duct. In this way, the system is capable to be used in a piping system which is efficient in accommodating space in a warehouse or greenhouse in horticulture.

In an embodiment, the edge around the opening is provided with a raised portion so as to define a level of a liquid surface when the carrier is loaded with the liquid. In this way, the top part of the raised portion of the edge around the opening defines the level of liquid required to keep the root of the plant or vegetable to be cultivated above this level.

In an embodiment, the raised portion of the edge around the opening is adjustable in height. In this way, the top part of the raised portion of the edge around the opening can be adjusted to a desired level of liquid required for a root of a specific plant or vegetable to be cultivated above this level.

In an embodiment, the carrier is rotationally connected on the frame. The carrier is convertible between a steady position and a slanting position. In the steady position, the carrier is resting on the frame, in the slanting position, the liquid can be emptied from carrier. In this way, the carrier may be emptied by slanting the carrier along a first axis so as to empty the carrier via the opening, thereby allowing the carrier to be readied for transport away from the frame, without causing the liquid to be splashed against the raised edges extending circumferentially along the bottom to form a container for holding a liquid for cultivating plants or vegetables.

In an embodiment, the opening is arranged at a first position near a first end along the longitudinal direction of the carrier, and a further opening is arranged at a second position near a second end along the longitudinal direction of the carrier which is opposite to the first end. In this way, the carrier may be emptied by slanting the carrier along a first axis so as to empty the carrier via the opening and by slanting the carrier along a second axis so as to empty the carrier via the further opening thereby allowing the liquid to be emptied from carrier more quickly.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

It should be noted that items which have the same reference numbers in different figures, have the same structural features and the same functions, or are the same signals. Where the function and/or structure of such item has been explained, there is no necessity for repeated explanation thereof in the detailed description.

DETAILED DESCRIPTION OF THE DRAWINGS

Figure 1:
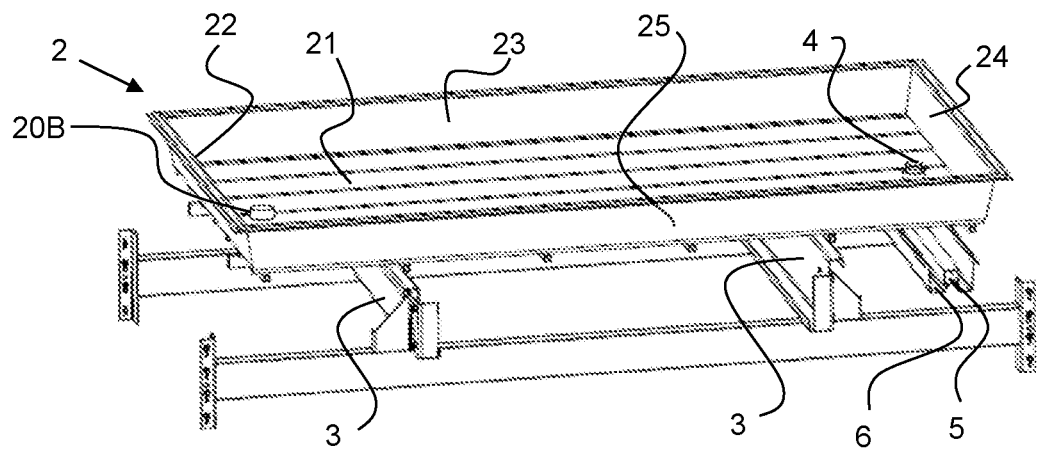
FIG. 1 is a perspective view on a system according to the invention, the figure depicting a carrier, a frame, a supply duct, a discharge duct, a sprayer device.

FIG. 1 shows a system 1 according to the invention, the system 1 being configured for cultivating plants or vegetables. The plants or vegetables, which are not shown in the figures, may be disposed on trays, which are not shown in the figures either, to be disposed in a carrier 2. The carrier is used for holding a layer of a liquid, such as water optionally provided with ingredients to stimulate cultivating of plants or vegetables. Such carrier 2 forms a container for holding one or more trays in which the plants or vegetables are cultivated, the trays resting on the bottom 21 of the carrier 2 or floating on the water surface. To achieve the best cultivating conditions, a root portion of the plant or vegetable grown out of a ball of earth needs to be located above the water surface at a constant distance.

The carrier 2 for holding the trays is configured to accommodate the plants or vegetables to be cultivated, the carrier 2 having an interior formed by a bottom 21 and raised edges 22, 23, 24, 25 extending circumferentially along the bottom 21 to form a container for holding a liquid Q for cultivating plants or vegetables. The carrier 2 is supported on a frame 3, which is, in this example formed by a kind of machine bed located and disposed in a space of a warehouse or a greenhouse in horticulture where the system 1 may be installed.

Figure 2:
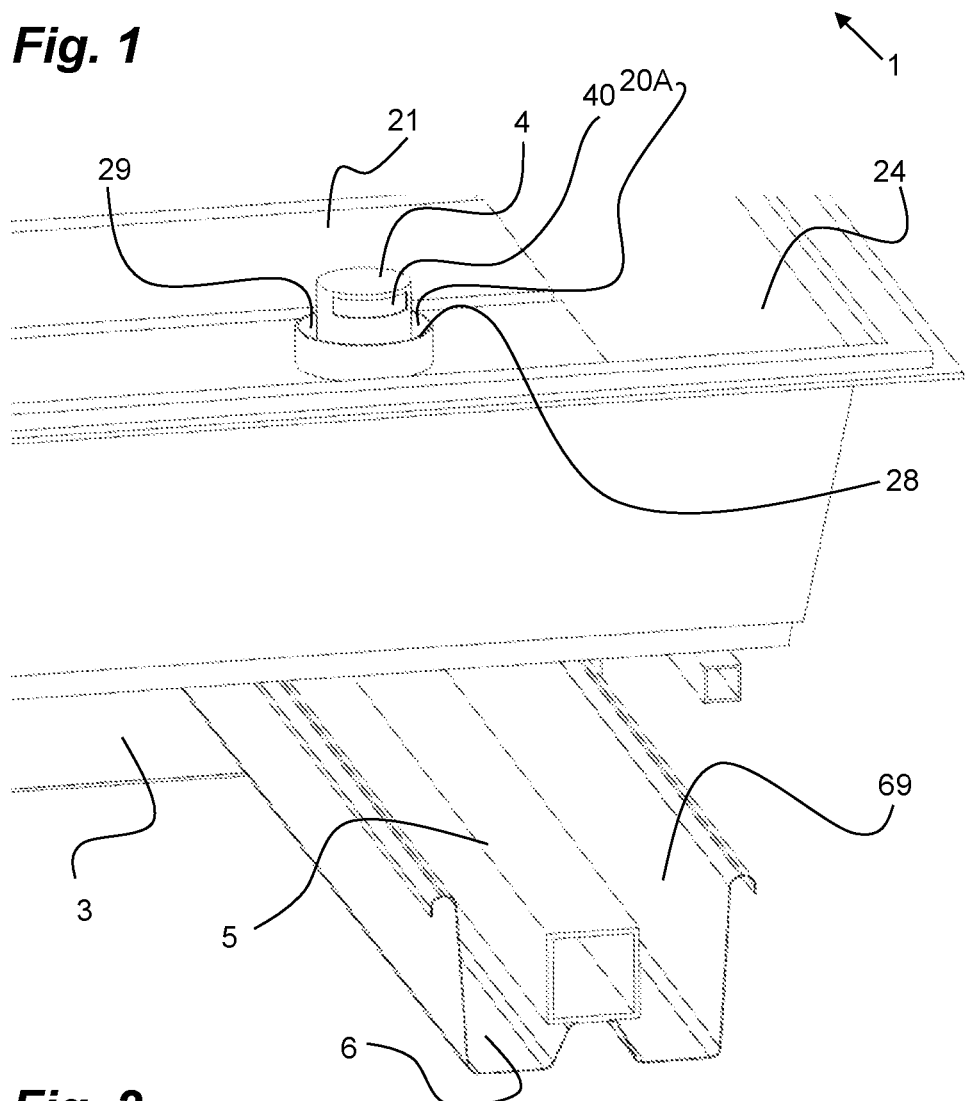
FIG. 2 is an enlarged view from FIG. 1 of a portion of the carrier wherein the sprayer device is arranged.

Referring to FIG. 2, an opening 20A is arranged in the bottom 21 of the carrier 2 to discharge the liquid Q present in the carrier 2 during operation. The opening 20A is formed by an edge 29, the opening 20A allowing a clearance 20A between a sprayer device 4 and the edge 29 so as to discharge the liquid Q via the opening 20A towards the discharge duct 6.

Figure 3:
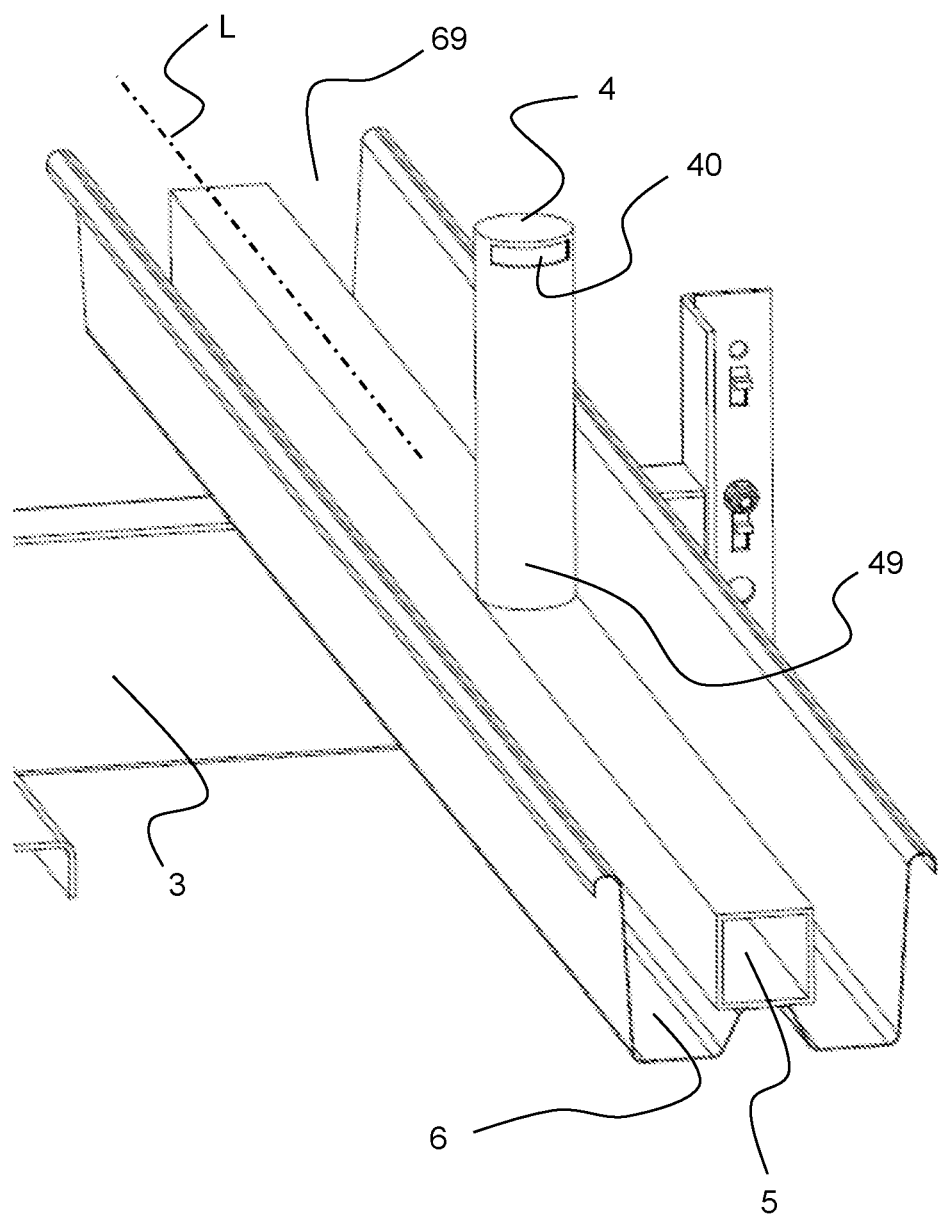
FIG. 3 is an enlarged depiction of the supply duct, the discharge duct, the sprayer device of the system according to the invention.

To provide the carrier 2 with the liquid, a supply duct 5 is arranged to supply the liquid Q towards the carrier 2. The supply duct 5 is arranged at least partly under the carrier 2. One end 49 of the sprayer device 4 is fluidically connected to the supply duct 5 to receive the liquid Q from the supply duct 5 and to allow it to flow to the other end of the sprayer device 4, at which end the sprayer device 4 is provided with a nozzle 40 to direct a flow of liquid to the interior of the carrier 2. Referring to FIG. 3, the sprayer device 4 is oriented substantially vertical so as to allow the carrier 2 to be moved along the sprayer device 4 when placing the carrier 2 on the frame 3. The supply duct 5 is oriented substantially horizontal so that the sprayer device 4 is substantially transverse to the supply duct 5.

FIG. 2 shows the sprayer device 4 extending through the opening 20A of the carrier 2, the nozzle 40 protruding into the interior of the carrier 2 when the carrier 2 is positioned on the frame 3. The discharge duct 6 is arranged partly under the opening 20A. The discharge duct 6 has an open top 69 at least at a portion of the discharge duct 6 located below the opening 20A for receiving discharged liquid Q from the carrier 2 flowing through the opening 20A. It will be understood that the discharge duct 6 is arranged to be slightly slanting to let the liquid Q flow in the direction for discharging the liquid Q.

The supply duct 5 and the discharge duct 6 are, from the position of the opening 20A and along at least a portion along their longitudinal direction L, arranged to be parallel to each other. The supply duct 5 is positioned to extend over the discharge duct 6 so as to discharge liquid Q flowing along the sprayer device 4 and/or along an outer circumferential wall of the supply duct 5 to the discharge duct 6 via the opening 20A.

The nozzle 40 is oriented in such a way as to direct a flow of liquid Q from the supply duct 5 to an exterior side of the sprayer device 4, the flow of liquid Q being substantially parallel to the longitudinal direction L of the discharge duct 6. In this way, the flow of liquid Q is falling into the discharge duct 6 when the carrier 2 is absent. In case the carrier 2 is placed on the frame 3, the flow of liquid Q is falling into the carrier 2 to supply a refreshment of the liquid Q to circulate through the carrier 2. In this example, the nozzle 40 is oriented to be transverse to one 25 of the raised edges 22, 23, 24, 25 of the carrier 2. When liquid Q is supplied to the carrier 2, the liquid Q will be splashed against the raised edges 22, 23, 24, 25 of the carrier 2 causing a system of flows of liquid Q circulating through the carrier 2, the flow ending up at the opening 20A to discharge the liquid Q.

In the figures, the carrier 2 is elongated along its longitudinal direction and wherein the longitudinal direction of the carrier 2 is substantially transverse to the longitudinal direction L of the discharge duct 6. This arrangement causes a piping system wherein the distances for the pipes are minimal.

Figure 4:
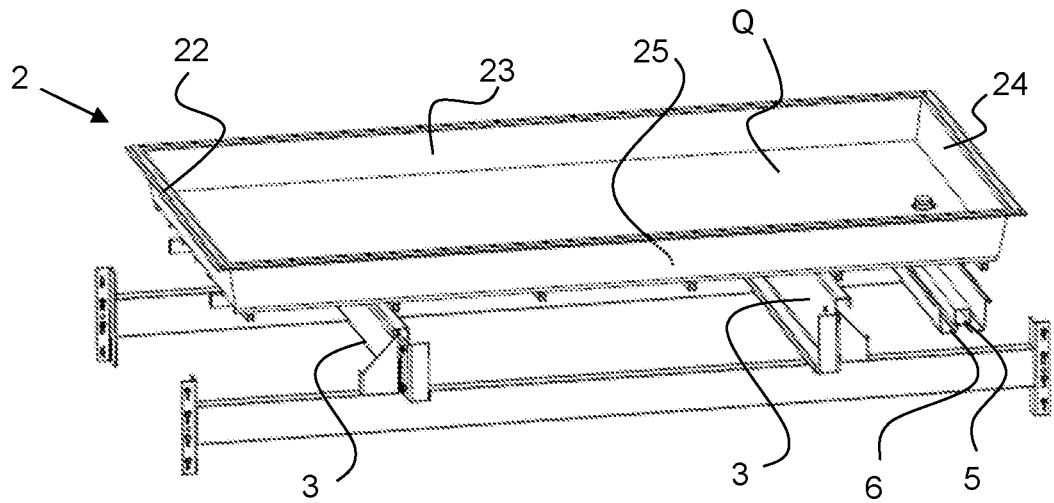
FIG. 4 is a perspective view on the system according to the invention wherein the carrier contains a layer of liquid.

FIG. 4 shows the carrier 2 containing the liquid Q. The top surface of the layer of liquid Q is flush with the top portion of the edge 29 forming the opening 20A. To determine a thickness of the top surface of the layer of liquid Q, the raised portion 28 of the edge 29 around the opening 20A is adjustable in height. In an example, the raised portion 28 of the edge 29 is provided with a thread and the bottom 21 of the carrier 2 is provided with a further thread cooperating with the thread of the raised portion 28 of the edge 29, so as to adjust a height of the raised portion 28 of the edge 29 with respect to the bottom 21 of the carrier 2.

Figure 5:
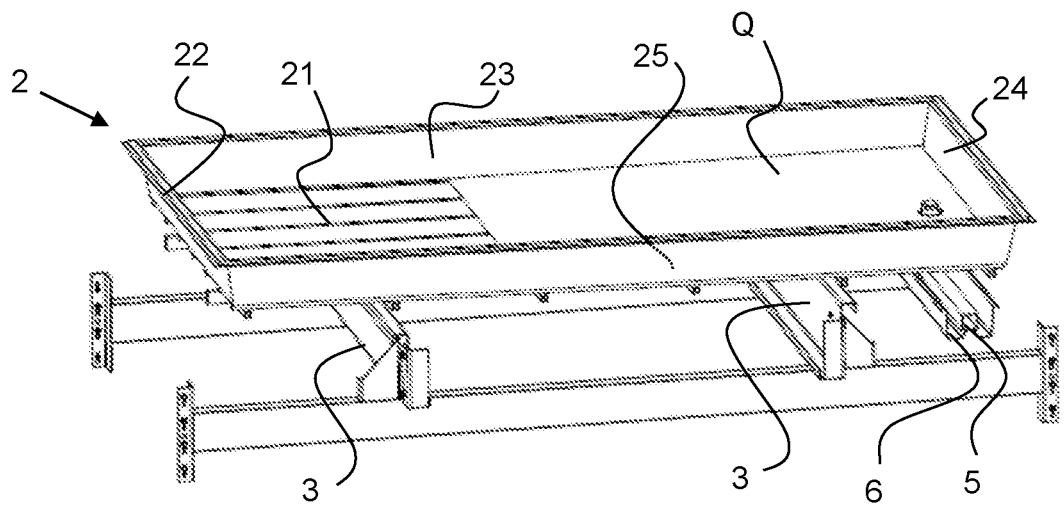
FIG. 5 is a perspective view on the system according to the invention wherein the carrier is slanting so as to at least partly discharge the liquid contained in the carrier according to FIG. 4.

As long as the carrier 2 is used to operate in a steady position wherein the carrier is resting on the frame, the plants or vegetables are located near the layer of liquid Q for the growing process. As soon as the carrier 2 needs to be conveyed to another location in the greenhouse, the liquid Q does not allow a proper conveyance since it will splash against the raised edges 22, 23, 24, 25 of the carrier 2. As depicted in FIG. 5, the carrier 2 is slightly tilted with respect to the frame 3 to cause the top portion of the layer of liquid Q to flow over the top portion of the edge 29 forming the opening 20A.

To facilitate a slanting orientation of the carrier 2 with respect to the frame 3, the carrier 2 is rotationally connected on the frame 3 so that a position of the carrier 2 is convertible between a steady position and a slanting position. In the steady position, the carrier 2 is resting on the frame 3, and in the slanting position, the carrier 2 is emptied from the liquid Q. In an alternative embodiment, the opening 20A is arranged at a first position near one end 24 along the longitudinal direction of the carrier 2, and a further opening 20B is arranged at a second position near a second end 22 along the longitudinal direction of the carrier 2 which is opposite to the first end 24.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugates does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for cultivating plants or vegetables, the system comprising:
 a carrier for holding trays accommodating the plants or vegetables to be cultivated, the carrier having an interior formed by a bottom and raised edges extending circumferentially along the bottom to form a container for holding a liquid for cultivating plants or vegetables, and an opening arranged at the bottom;
 a frame to support the carrier;
 a supply duct for supplying the liquid towards the carrier, the supply duct arranged at least partly under the carrier;
 a sprayer device which is at one end fluidly connected to the supply duct and which is at the other end provided with a nozzle to direct a flow of the liquid to the interior of the carrier;
 wherein:
 the sprayer device is arranged through the opening of the carrier, the nozzle protruding into the interior of the carrier when the carrier is positioned on the frame,
 the system further comprises a discharge duct arranged to be partly located under the opening,
 the discharge duct has an open top at least at a portion of the discharge duct located under the opening for receiving a discharged liquid flowing through the opening from the carrier,
 the opening is confined by an edge,
 the opening allows a clearance between the sprayer device and the edge so as to discharge the liquid via the opening towards the discharge duct,
 the supply duct and the discharge duct are arranged parallel to each other along at least a portion of their respective lengths, the portion including a position under the opening, and
 the supply duct is positioned to extend over the discharge duct so that the discharge duct is positioned to receive the discharged liquid from the opening.

2. A system for cultivating plants or vegetables, the system comprising:
 a carrier for holding trays accommodating the plants or vegetables to be cultivated, the carrier having an interior formed by a bottom and raised edges extending circumferentially along the bottom to form a container for holding a liquid for cultivating plants or vegetables, and an opening arranged at the bottom;
 a frame to support the carrier;
 a supply duct for supplying the liquid towards the carrier, the supply duct arranged at least partly under the carrier;
 a sprayer device which is at one end fluidly connected to the supply duct and which is at the other end provided with a nozzle to direct a flow of the liquid to the interior of the carrier;
 wherein:
 the sprayer device is arranged through the opening of the carrier, the nozzle protruding into the interior of the carrier when the carrier is positioned on the frame,
 the system further comprises a discharge duct arranged to be partly located under the opening, the discharge duct has an open top at least at a portion of the discharge duct located under the opening for receiving a discharged liquid flowing through the opening from the carrier, the opening is confined by an edge, the opening allows a clearance between the sprayer device and the edge so as to discharge the liquid via the opening towards the discharge duct, the nozzle is oriented in such a way as to direct the flow of the liquid from the supply duct to an exterior side of the sprayer device, and the flow of the liquid is substantially parallel to a length direction of the discharge duct, so as to cause the liquid to flow into the discharge duct when the carrier is absent and cause the liquid to flow into the carrier when the carrier is present on the frame.

3. The system according to claim 1, wherein the nozzle is oriented transverse to one of the raised edges of the carrier.

4. The system according to 1, wherein the nozzle is located in a corner portion of the carrier.

5. The system according to claim 1, wherein the carrier is elongated along a length direction of the carrier and wherein the length direction of the carrier is substantially transverse to a length direction of the discharge duct.

6. The system according to claim 1, wherein the edge around the opening is provided with a raised portion so as to define a level of a liquid surface when the carrier is loaded with the liquid.

7. The system according to claim 1, wherein a raised portion of the edge around the opening is adjustable in height.

8. The system according to claim 6, wherein the carrier is rotationally connected on the frame so that a position of the carrier is convertible between a steady position in which the carrier is resting on the frame, and a slanting position which causes the liquid to empty from the carrier.

9. The system according to claim 1, wherein the opening is arranged at a first position near a first end along a length direction of the carrier, and wherein a further opening is arranged at a second position near a second end along the length direction of the carrier which is opposite to the first end.

* * * * *